US012525747B2

(12) United States Patent
Chiu et al.

(10) Patent No.: US 12,525,747 B2
(45) Date of Patent: Jan. 13, 2026

(54) CARD EDGE CONNECTOR WITH SHIELDING STRUCTURE AND SHIELDING MEMBER

(71) Applicant: ACCTON TECHNOLOGY CORPORATION, Hsinchu (TW)

(72) Inventors: Chun-Wei Chiu, Hsinchu (TW); Pai-Yuan Hsiao, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 315 days.

(21) Appl. No.: 18/387,955

(22) Filed: Nov. 8, 2023

(65) Prior Publication Data

US 2025/0023300 A1 Jan. 16, 2025

(30) Foreign Application Priority Data

Jul. 14, 2023 (CN) ......................... 202321851926.2

(51) Int. Cl.
*H01R 13/6581* (2011.01)
*H01R 12/72* (2011.01)
*H01R 12/73* (2011.01)

(52) U.S. Cl.
CPC ....... *H01R 13/6581* (2013.01); *H01R 12/721* (2013.01); *H01R 12/73* (2013.01)

(58) Field of Classification Search
CPC ... H01R 13/6581; H01R 12/721; H01R 12/73
USPC ............ 439/607.01, 607.14, 607.31, 607.32, 439/607.35, 607.55
See application file for complete search history.

(56) References Cited

U.S. PATENT DOCUMENTS 6,238,240 B1 * 5/2001 Yu ........................ H01R 12/716 439/541.5
6,267,624 B1 * 7/2001 Wu ...................... H01R 13/658 439/607.35
6,319,059 B1 * 11/2001 Wu ........................ H01R 12/57 439/607.14
7,029,331 B1 * 4/2006 Lai ..................... H01R 13/6582 439/939
7,097,504 B2 * 8/2006 Kan ....................... H01R 12/00 439/752

(Continued)

FOREIGN PATENT DOCUMENTS

KR 101498847 B1 * 3/2015 ........... H01R 12/721

*Primary Examiner* — Tulsidas C Patel
*Assistant Examiner* — Thomas K Quigley
(74) *Attorney, Agent, or Firm* — Birch, Stewart, Kolasch & Birch, LLP

(57) ABSTRACT

A shielding member adapted to cover a card edge connector that has a card slot for inserting an electronic card includes a shielding cover covering the card edge connector, having an opening disposed in a position corresponding to a jack of the card slot, and including a top plate, an extending plate, and several side plates. The top plate is disposed on a top portion of the card edge connector. The side plates are connected to the top plate and are disposed on several side portions of the card edge connector. The extending plate is located near the opening of the shielding cover and has a connecting portion connected to the top plate and a contacting portion connected to the connecting portion, formed by bending toward the opening of the shielding cover, and being in contact with the electronic card in a direction away from the opening.

20 Claims, 9 Drawing Sheets

(56) References Cited

U.S. PATENT DOCUMENTS 7,097,507 B1 * 8/2006 Zhang ................ H01R 13/6582 439/95
7,614,912 B2 * 11/2009 Cheng .................. H01R 12/714 439/946
7,753,723 B2 * 7/2010 Ting ..................... H01R 12/725 439/541.5
7,914,330 B2 * 3/2011 Su ........................ H01R 12/714 439/607.31
7,938,684 B2 * 5/2011 Lin ...................... H01R 12/592 439/607.31
7,967,639 B1 * 6/2011 Huang ............... H01R 13/6594 439/862
8,011,956 B1 * 9/2011 Yang .................. H01R 13/5202 439/589
8,021,187 B2 * 9/2011 Tagawa ................ H01R 13/658 439/607.31
8,057,259 B2 * 11/2011 Konno ................. H01R 12/725 439/607.35
8,123,561 B2 * 2/2012 Zhang ................ H01R 13/6585 439/607.31
8,202,126 B2 * 6/2012 Lim ................... H01R 13/6581 439/607.31
8,500,488 B2 * 8/2013 Hsu .................... H01R 13/6582 439/607.31
8,517,745 B1 * 8/2013 Yang .................... H01R 12/721 439/152
8,777,667 B2 * 7/2014 Huang ............... H01R 13/6582 439/607.53
2007/0197093 A1 * 8/2007 Chen .................. H01R 13/6594 439/607.31
2007/0243764 A1 * 10/2007 Liu .................... H01R 13/6581 439/607.01
2009/0253296 A1 * 10/2009 Zhu ........................ G06K 13/08 439/607.31
2010/0159747 A1 * 6/2010 Chang ................ H01R 13/6658 439/607.35
2010/0178803 A1 * 7/2010 Chang ................ H01R 13/6588 439/607.31
2010/0279546 A1 * 11/2010 Yang .................. H01R 13/6594 439/607.31
2011/0053388 A1 * 3/2011 Zhu ........................ H05K 1/142 439/62
2011/0059652 A1 * 3/2011 Hoyack ................ H01R 12/732 439/607.31
2011/0318963 A1 * 12/2011 Kamoya ............ H01R 13/6594 439/607.35
2012/0058661 A1 * 3/2012 Wu ...................... H01R 13/639 439/327
2012/0122340 A1 * 5/2012 Zhang .................. H01R 12/714 439/607.31
2013/0084744 A1 * 4/2013 Zerebilov .......... H01R 12/7052 439/607.35
2013/0178100 A1 * 7/2013 Nagata ................. H01R 13/648 439/607.58
2015/0263459 A1 * 9/2015 Pavageau ............. G06K 7/0021 439/607.14
2015/0311640 A1 * 10/2015 Kurachi ................. H01R 12/89 439/607.31
2015/0340817 A1 * 11/2015 Li ...................... H01R 13/6598 29/830
2022/0336980 A1 * 10/2022 Lu .......................... H01R 13/26
2023/0132094 A1 * 4/2023 Liu .................... H01R 13/6597 439/607.31
2023/0163529 A1 * 5/2023 Lv ...................... H01R 13/6594 439/607.31

* cited by examiner

CARD EDGE CONNECTOR WITH SHIELDING STRUCTURE AND SHIELDING MEMBER

BACKGROUND OF THE INVENTION

Technical Field

The present disclosure relates generally to a card edge connector, and more particularly to a card edge connector with a shielding member.

Description of Related Art

A conventional card edge connector is widely applied to the connection between various electronic equipment. Generally, the card edge connector is disposed on a circuit board, is electrically connected to the circuit board, and has a jack for inserting an electronic card. In this way, when the electronic card is inserted into the card edge connector, an electrical contact of the electronic card could be correspondingly connected to a conductive terminal of the card edge connector, so that the electrical connection between the circuit board and the electronic card could be achieved.

Additionally, a conventional shielding member is normally disposed on an external portion of the conventional card edge connector, and the shielding member could be connected to the circuit board and the electronic card and be grounded, thereby inhibiting or reducing interference of the noise. When the electronic card is inserted into the card edge connector, a protruding portion of the conventional shielding member is in contact with a top portion of a metal housing of the electronic card and covers a cooling zone of the metal housing. As a result, an area of the cooling zone of the metal housing is reduced because of covering of the shielding member, thereby causing the problem of the poor cooling efficiency.

BRIEF SUMMARY OF THE INVENTION

In view of the above, the primary objective of the present disclosure is to provide a shielding member, which could relieve the problem of the poor cooling efficiency of an electronic card cooling when the electronic card is inserted into a card edge connector.

The present disclosure provides a shielding member, which is adapted to cover a card edge connector, wherein the card edge connector has a card slot for inserting an electronic card. The shielding member includes a shielding cover covering the card edge connector and having an opening disposed in a position corresponding to a jack of the card slot: the shielding cover includes a top plate, at least one extending plate, and a plurality of side plates, wherein the top plate is disposed on a top portion of the card edge connector: the plurality of side plates are connected to the top plate and are disposed on a plurality of side portions of the card edge connector: the at least one extending plate is located near the opening of the shielding cover and has a connecting portion and a contacting portion connected to the connecting portion, wherein the connecting portion is connected to the top plate: the contacting portion is formed by bending toward the opening of the shielding cover and is in contact with the electronic card in a direction away from the opening.

In an embodiment, at least one through hole is disposed between the top plate and the contacting portion of the at least one extending plate.

In an embodiment, the top plate has a plurality of recesses formed by recessing inwards from the opening of the shielding cover: the at least one extending plate includes a plurality of extending plates: the plurality of recesses and the plurality of the extending plates are arranged in a staggered arrangement in a horizontal direction.

In an embodiment, a surface of the contacting portion opposite to the opening of the shielding cover has a plurality of protruding points: the protruding points are arranged in the horizontal direction.

In an embodiment, the shielding member further includes a shielding frame, wherein the shielding frame includes a top frame and a plurality of side frames, wherein the top frame is disposed on the top portion of the card edge connector: the plurality of side frames are connected to the top frame and are disposed on the plurality of side portions of the card edge connector: the shielding frame is disposed on the card edge connector; the shielding cover covers the shielding frame and is in contact with the shielding frame.

In an embodiment, either the plurality of side frames or the plurality of side plates have at least one protruding member, and the other one of the plurality of side frames and the plurality of side plates has at least one engaging hole matching with the at least one protruding member: the at least one protruding member is engaged with the at least one engaging hole.

In an embodiment, the contacting portion has a bending portion being in contact with the electronic card.

The present disclosure further provides a card edge connector with a shielding structure for being disposed on a circuit board: the card edge connector with the shielding structure includes a card edge connector and the aforementioned shielding member, wherein a side of the card edge connector has a card slot for inserting an electronic card; the card edge connector includes a plurality of conductive terminals disposed on a jack of the card slot: the shielding member covers the card edge connector.

In an embodiment, at least one through hole is disposed between the top plate and the contacting portion of the at least one extending plate: a projection of the at least one through hole on the card edge connector at least partially covers the plurality of conductive terminals.

In an embodiment, the top plate has a plurality of recesses formed by recessing inwards from the opening of the shielding cover: a projection of the plurality of recesses on the card edge connector at least partially covers the plurality of conductive terminals.

In an embodiment, the shielding member includes a shielding frame, and the shielding frame includes a top frame and a plurality of side frames, wherein the top frame is disposed on the top portion of the card edge connector: the plurality of side frames are connected to the top frame and are disposed on the plurality of side portions of the card edge connector: the shielding frame is disposed on the card edge connector; the shielding cover covers the shielding frame and is in contact with the shielding frame.

With the aforementioned design, the contacting portion is formed by bending toward the opening of the shielding cover, so that when the contacting portion is in contact with the metal housing of the electronic card, the contacting portion could be in contact with a side wall of the metal housing of the electronic card without covering the cooling zone of the top portion of the metal housing of the electronic card. In this way, the area of the cooling zone of the metal housing of the electronic card could be increased, thereby solving the problem that the conventional shielding member causes the poor cooling efficiency of the electronic card.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 2:
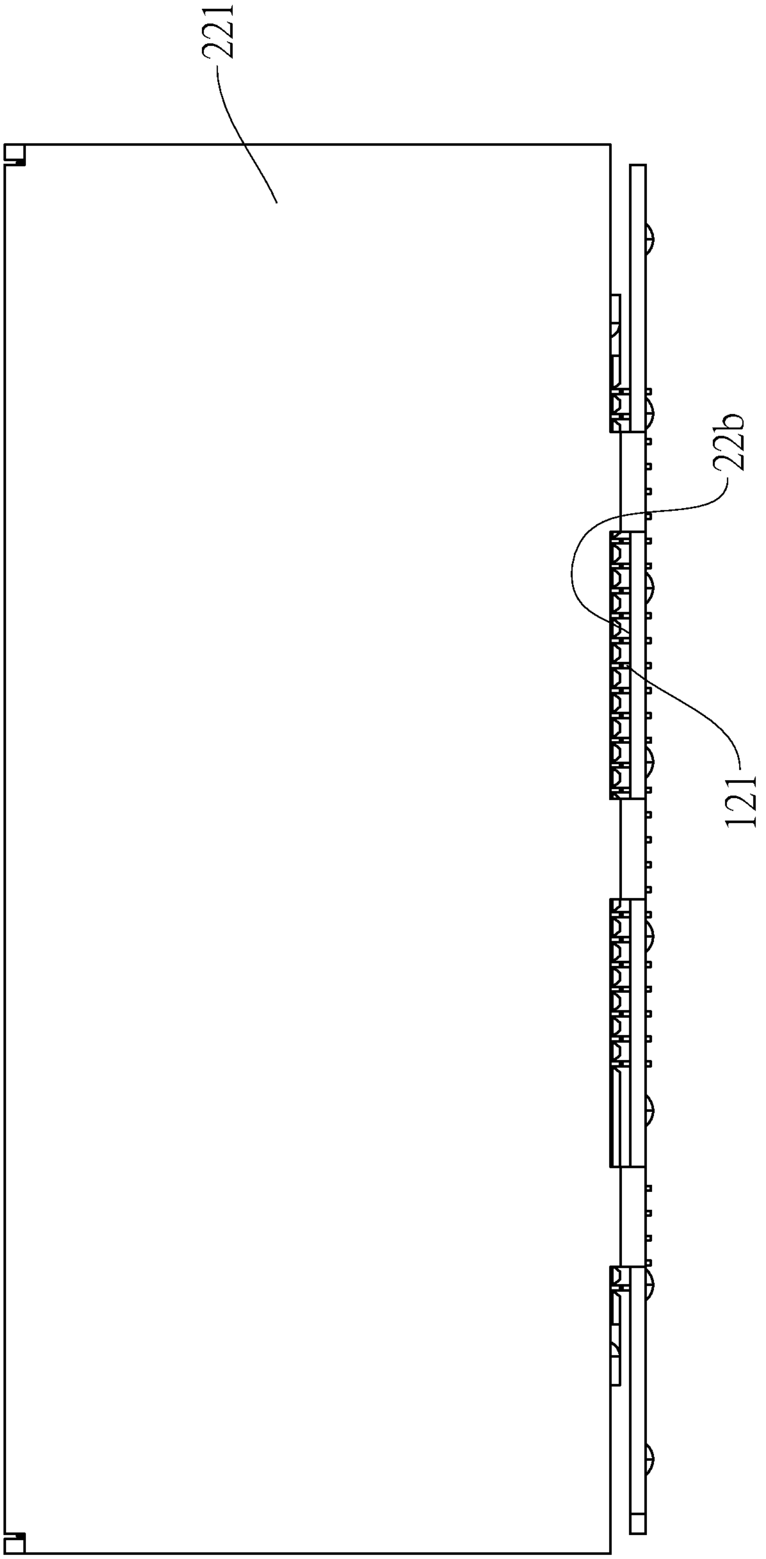
FIG. 2 is a top view of the card edge connector with the shielding structure according to the embodiment of the present disclosure.
Figure 3:
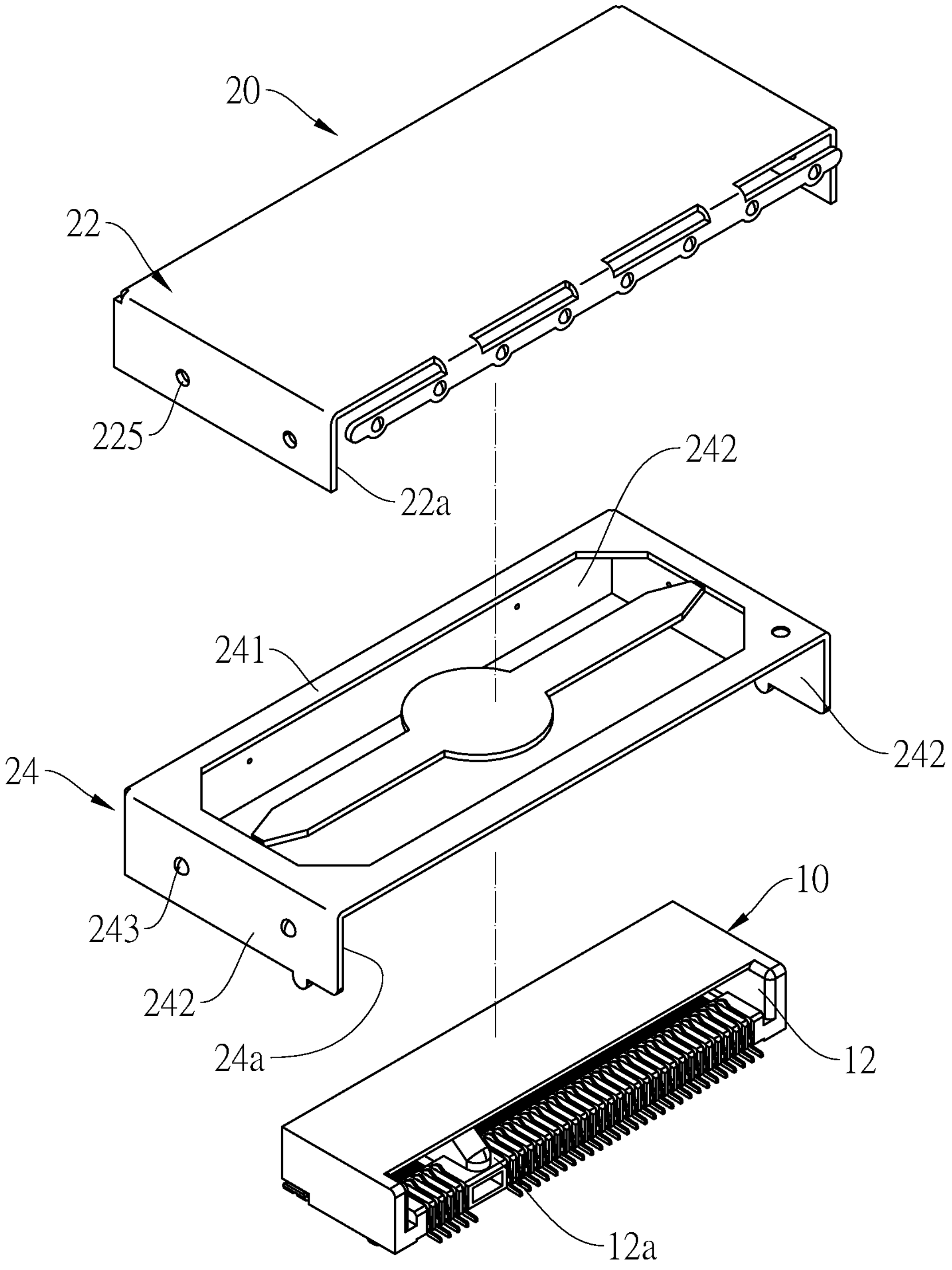
FIG. 3 is a schematic view, showing a part of the card edge connector with the shielding structure according to the embodiment of the present disclosure being exploded.
Figure 4:
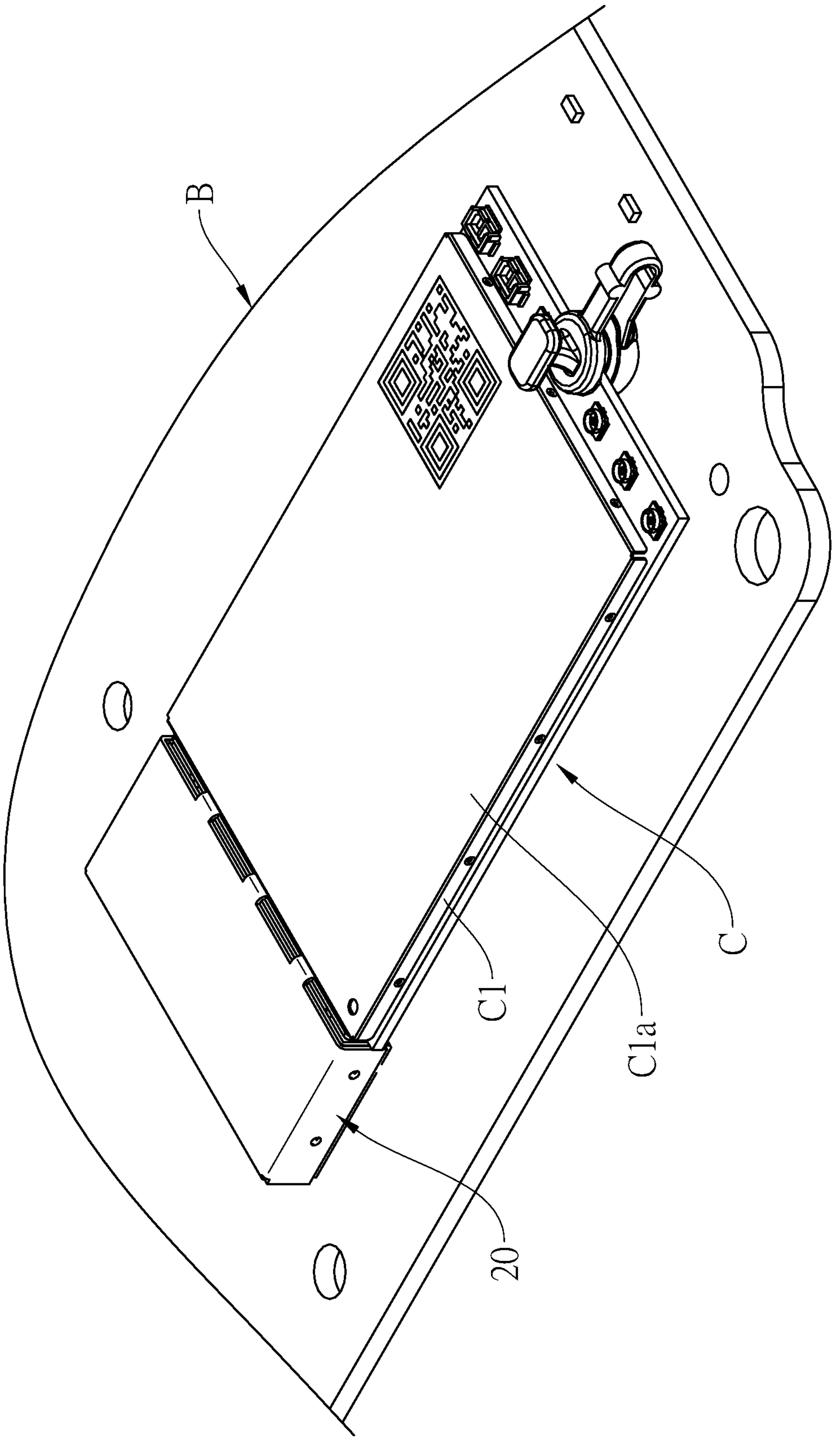
FIG. 4 is a perspective view, showing the card edge connector with the shielding structure according to the embodiment of the present disclosure being disposed on the circuit board.

A card edge connector with a shielding structure 1 according to an embodiment of the present disclosure is illustrated in FIG. 1 to FIG. 5 and includes a card edge connector 10 and a shielding member 20, wherein a side of the card edge connector 10 has a card slot 12. The card edge connector 10 is disposed on a circuit board B, and an electronic card C could be inserted into the card slot 12 (as shown in FIG. 4). The shielding member 20 covers the card edge connector 10. The shielding member 20 is grounded and is in contact with a metal housing C1 of the electronic card C, thereby inhibiting or reducing interference of the noise.

Figure 1:
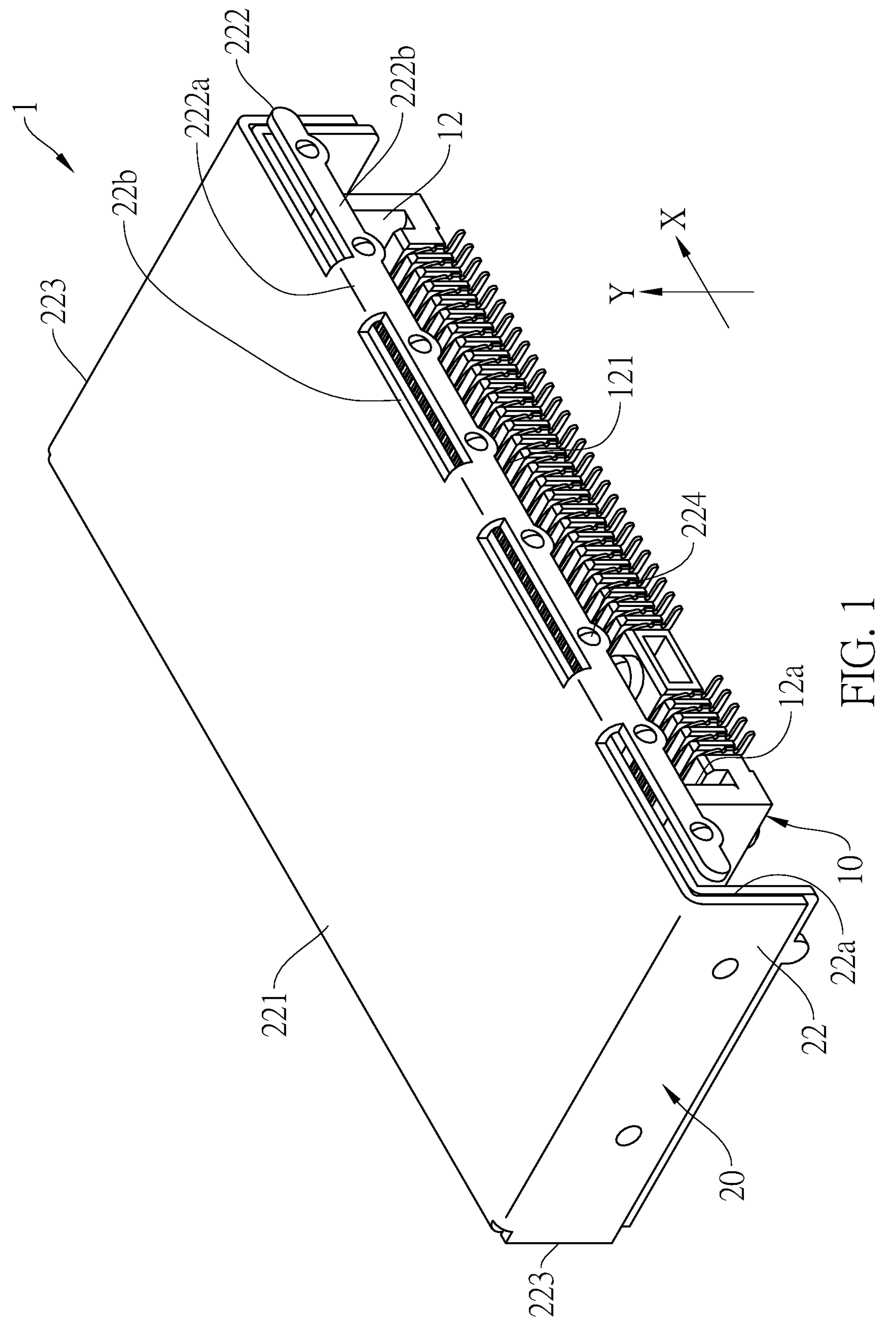
FIG. 1 is a perspective view of the card edge connector with the shielding structure according to an embodiment of the present disclosure.

Referring to FIG. 1 to FIG. 3, the shielding member 20 includes a shielding cover 22 correspondingly disposed on the card edge connector 10. The shielding cover 22 includes a top plate 221, an extending plate 222, and a plurality of side plates 223, wherein the top plate 221 corresponds to the card edge connector 10 to form a quadrilateral. In the current embodiment, the number of the side plates 223 is three corresponding to the card edge connector 10, wherein the side plates 223 are respectively connected to three side edges of the top plate 221, and two of the side plates 223 that are adjacent are connected to each other. The top plate 221 and two of the side plates 223 that are respectively on a right side and a left side surround to form an opening 22*a* of the shielding cover 22 having a side. When the shielding cover 22 covers an outside of the card edge connector 10, the opening 22*a* of the shielding cover 22 could be correspondingly disposed in a position corresponding to a jack 12*a* of the card slot 12, the top plate 221 could be correspondingly disposed on a top portion of the card edge connector 10, and the side plates 223 could be correspondingly disposed on a plurality of side portions of the card edge connector 10.

Figure 5:
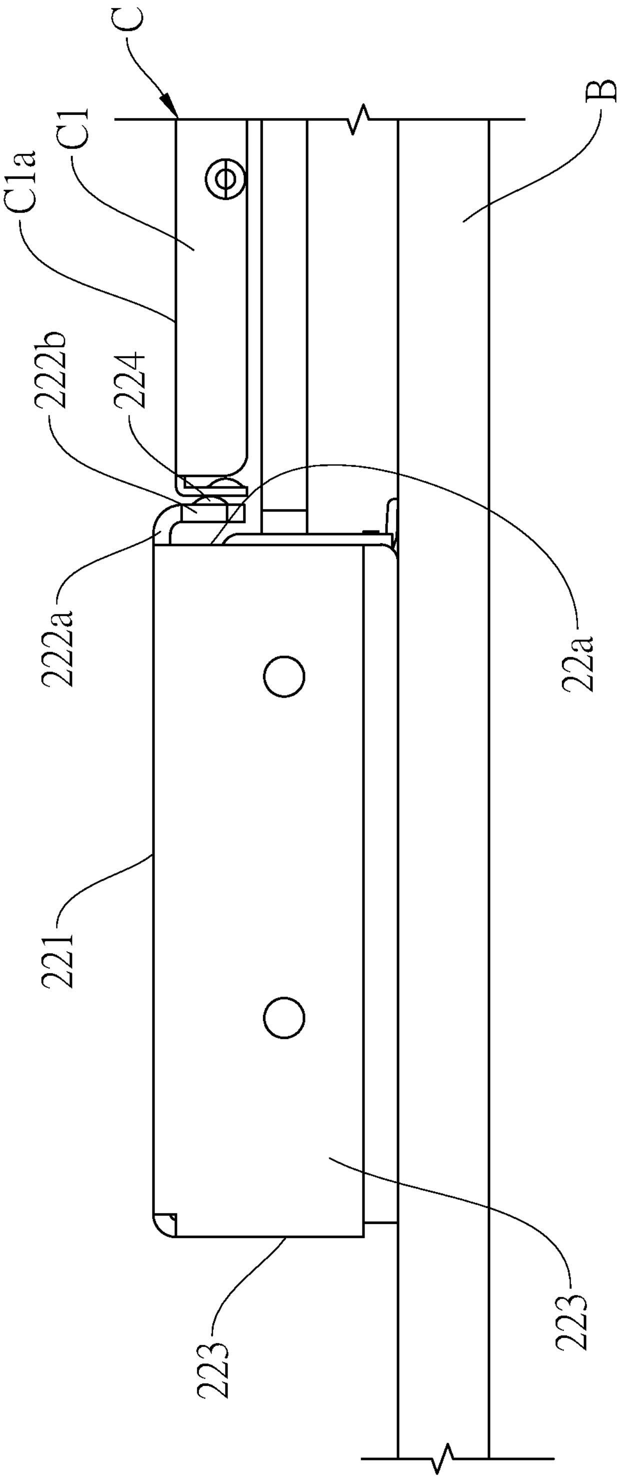
FIG. 5 is a side view of the card edge connector with the shielding structure according to the embodiment of the present disclosure.

The extending plate 222 is disposed in a position near the opening 22*a* of the shielding cover 22 and has a connecting portion 222*a* and a contacting portion 222*b* connected to the connecting portion 222*a*, wherein the connecting portion 222*a* is connected to a side edge of the top plate 221 on the opening 22*a*. The contacting portion 222*b* is formed by bending toward the opening 22*a* of the shielding cover 22. As shown in FIG. 5, the contacting portion 222*b* is in a shape of a sheet and an angle between the contacting portion 222*b* and the top plate 221 is 90 degrees. In this way, when the electronic card C is inserted into the card slot 12, a surface of the contacting portion 222*b* opposite to the opening 22*a* could abut against a side portion of the metal housing C1 of the electronic card C facing the opening 22*a*, so that the purpose for inhibiting or reducing the interference of the noise could be achieved and the shielding cover 22 would not cover a cooling zone C1*a* of a top portion of the metal housing C1 of the electronic card C, thereby enhancing the cooling efficiency of the electronic card C.

Referring to FIG. 1, the surface of the contacting portion 222*b* opposite to the opening 22*a* of the shielding cover 22 has a plurality of protruding points 224, wherein the protruding points 224 are arranged in a horizontal direction X. When the electronic card C is inserted into the card slot 12, the protruding points 224 could abut against the side portion of the metal housing C1 of the electronic card C. As shown in FIG. 1, a width of a portion of the contacting portion 222*b* with the protruding points 224 in a vertical direction Y is larger than a width of another portion of the contacting portion 222*b* without the protruding points 224 in the vertical direction Y, which could shrink an area of a plate of the contacting portion 222*b*. Through the design of the contacting portion 222*b* being in sheet-shape, the contacting portion 222*b* could stay flexible, thereby preventing the electronic card C from being incorrectly installed due to the disturbance of the contacting portion 222*b* during inserting the electronic card C.

Referring to FIG. 1, a plurality of through holes 22*b* is disposed between the top plate 221 and the contacting portion 222*b* of the extending plate 222 and is arranged in the horizontal direction X. In the current embodiment, the connecting portion 222*a* of the extending plate 222 and the through holes 22*b* are arranged at intervals in the horizontal direction X. Additionally, as shown in FIG. 2, the card edge connector 10 includes a plurality of conductive terminals 121 disposed on the jack 12*a* of the card slot 12, wherein a projection of the through holes 22*b* on the card edge connector 10 in the vertical direction Y at least partially covers the conductive terminals 121. In other words, when a user would insert the electronic card C into the card slot 12, the user could see the jack 12*a* of the card slot 12 through the through holes 22*b* to clearly identify a position of the jack 12*a*, thereby enhancing the convenience and the accuracy of assembling the electronic card C.

In the current embodiment, the through holes 22*b* are disposed as an example. In practice, the number of the through hole 22*b* could be one; for example, a rectangular through hole extending in the horizontal direction X could be disposed, which could also allow the user to clearly identify the position of the jack 12*a*.

Referring to FIG. 3, in the current embodiment, the shielding member 20 further includes a shielding frame 24, wherein the shielding frame 24 includes a top frame 241 and a plurality of side frames 242. The top frame 241 corresponds to the card edge connector 10 to form a quadrilateral. In the current embodiment, the number of the side frames 242 is three corresponding to the card edge connector 10, wherein the side frames 242 are respectively connected to three side edges of the top frame 241, and two of the side frames 242 that are adjacent are connected to each other. The top frame 241 and the side frames 242 on a right side and a left side surround to form a shielding frame 24 having an opening 24*a* with a side. When the shielding frame 24 covers the outside of the card edge connector 10, the opening 24*a* of the shielding frame 24 could be correspondingly disposed in the position corresponding to the jack 12*a* of the card slot 12, the top frame 241 could be correspondingly disposed on the top portion of the card edge connector 10, the side plates 223 could be correspondingly disposed on the side portions of the card edge connector 10, and the shielding cover 22 covers and is in contact with the shielding frame 24.

Either the side frames 242 or the side plates 223 have at least one protruding member 243, and the other one of the side frames 242 and the side plates 223 has at least one engaging hole 225 matching with the at least one protruding member 243, wherein the at least one protruding member 243 could be engaged with the at least one engaging hole 225. In this way, when the shielding cover 22 covers the shielding frame 24, the shielding cover 22 and the shielding frame 24 could be connected to each other by the at least one protruding member 243 being engaged with the at least one engaging hole 225, thereby achieving the effect of rapidly installing and positioning. In the current embodiment, each of the side frames 242 has two protruding members 243 and each of the side plates 223 has two engaging holes 225 as an example: the number of the at least one protruding member 243 and the number of the at least one engaging hole 225 are not limited to two, but could correspondingly be one or plural. Additionally, in other embodiments, the side frames 242 could have the at least one engaging hole 225, and the side plates 223 could correspondingly have the at least one protruding member 243.

In the current embodiment, the shielding member 20 is a shielding member 20 in two pieces including the shielding cover 22 and the shielding frame 24 is grounded, wherein the shielding cover 22 is respectively in contact with the shielding frame 24 and the metal housing C1 of the electronic card C. In other embodiments, only the shielding cover 22 could be disposed, wherein the shielding cover 22 is directly grounded and could be in contact with the metal housing C1 of the electronic card C; a through hole could be disposed on the top plate 221 of the shielding cover 22 based on the demand.

Figure 6:
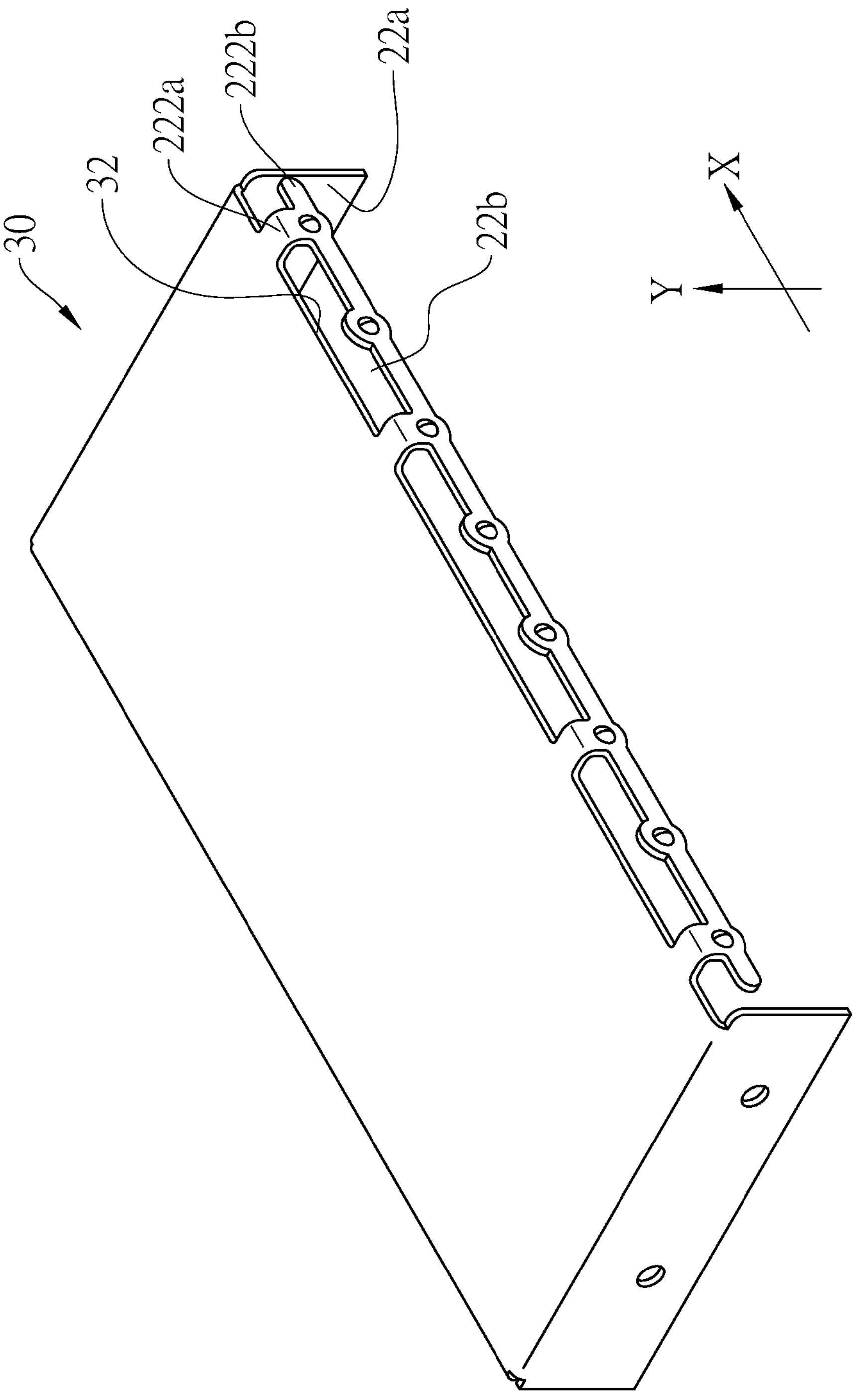
FIG. 6 is a perspective view of the shielding member according to another embodiment of the present disclosure.

A shielding cover 30 according to another embodiment of the present disclosure is illustrated in FIG. 6 and has almost the same structure as the shielding cover 22 of the embodiment, except that the top plate 221 of the shielding cover 30 in the current embodiment has a plurality of recesses 32, wherein the recesses 32 are formed by recessing inwards from the opening 22*a* of the shielding cover 30 and communicate with the through holes 22*b*; a projection of the recesses 32 on the card edge connector 10 in the vertical direction Y at least partially covers the conductive terminals 121: in this way, when a user inserts the electronic card C into the card slot 12, the position of the jack 12*a* of the card slot 12 could be identified more clearly, thereby effectively enhancing the convenience and the accuracy of assembling the electronic card C.

Figure 7:
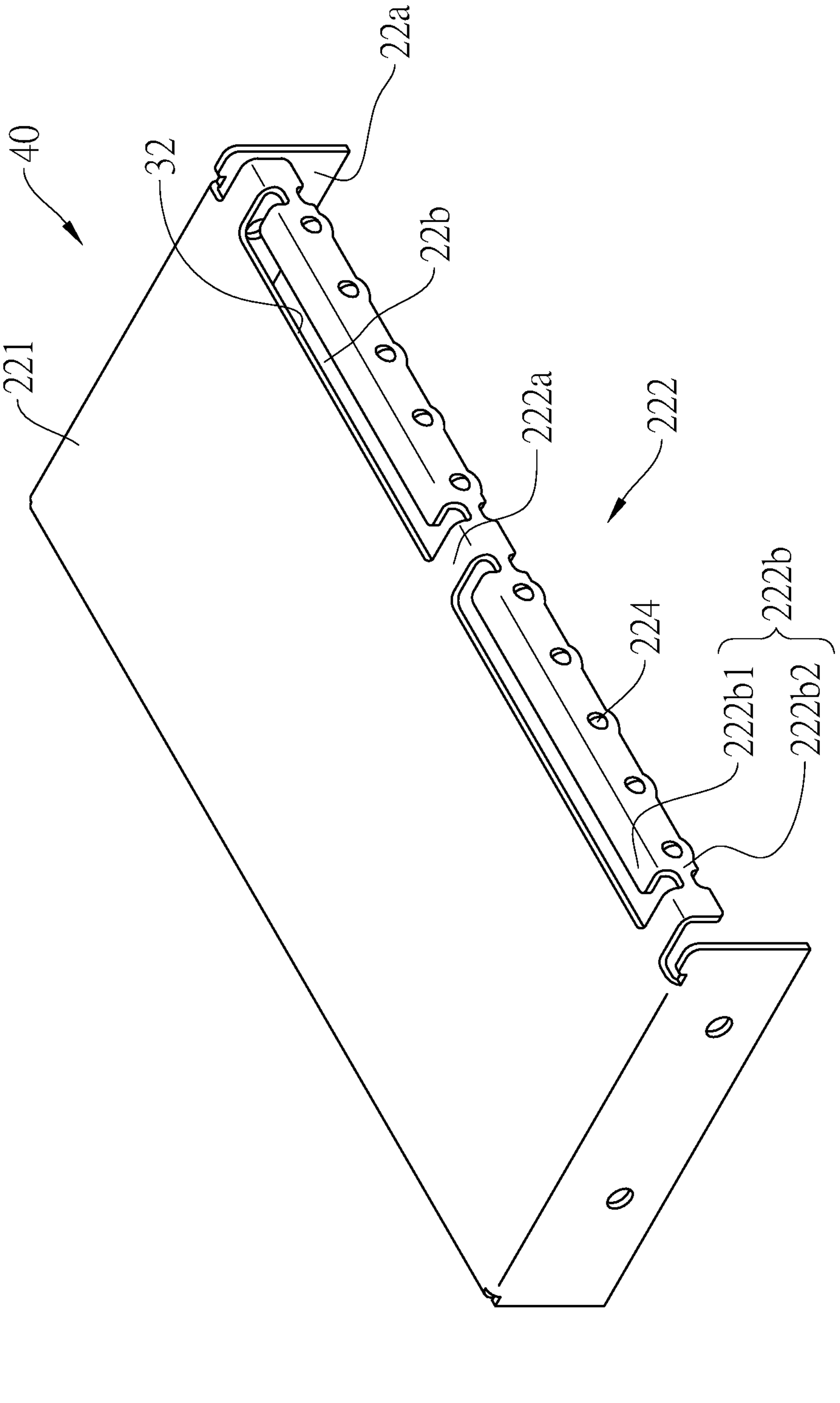
FIG. 7 is a perspective view of the shielding member according to still another embodiment of the present disclosure.

A shielding cover 40 according to still another embodiment of the present disclosure is illustrated in FIG. 7 and has almost the same structure as the shielding cover 22 of the embodiment, except that the top plate 221 of the shielding cover 40 in the current embodiment has a plurality of recesses 32, wherein the recesses 32 are formed by recessing inwards from the opening 22*a* of the shielding cover 40 and correspondingly communicate with the through holes 22*b*: the contacting portion 222*b* of the extending plate 222 has a first portion 222*b*1 and a second portion 222*b*2 connected to the first portion 222*b*1, wherein the first portion 222*b*1 and the top plate 221 are parallel: the second portion 222*b*2 bends toward the opening 22*a* of the shielding cover 40 until an angle between the second portion 222*b*2 and the first portion 222*b*1 becomes 90 degrees; the protruding points 224 are disposed on a surface of the second portion 222*b*2 opposite to the opening 22*a* of the shielding cover 40.

Figure 8:
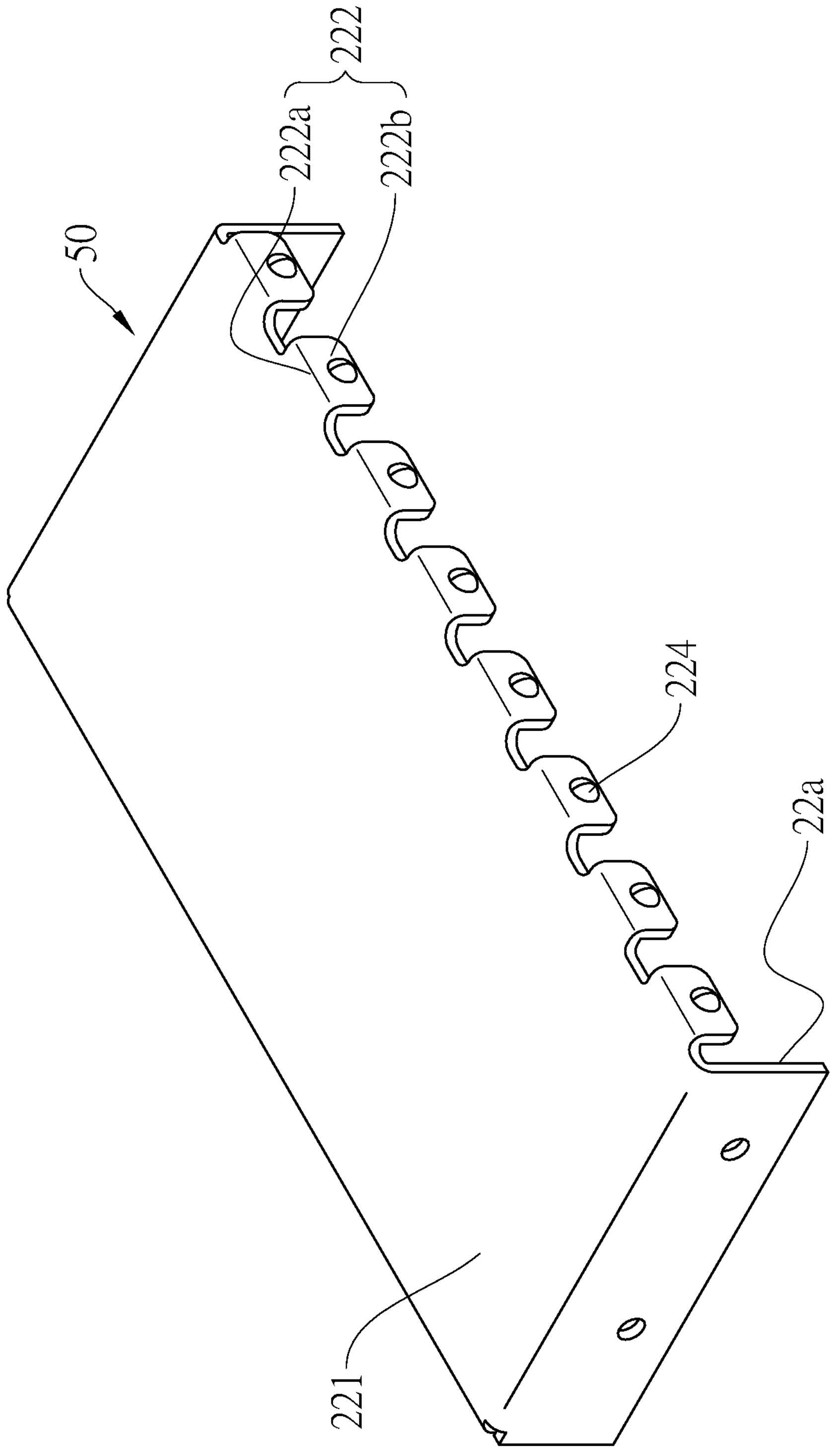
FIG. 8 is a perspective view of the shielding member according to still another embodiment of the present disclosure.

A shielding cover 50 according to still another embodiment of the present disclosure is illustrated in FIG. 8 and has almost the same structure as the shielding cover 22 of the embodiment, except that in the current embodiment, the number of the extending plates 222 of the shielding cover 50 is plural, and the extending plates 222 are arranged at intervals in the horizontal direction X: the connecting portion 222*a* of each of the extending plates 222 is connected to a peripheral edge of a side of the top plate 221 on the opening 22*a*, and the contacting portion 222*b* of each of the extending plates 222 bends toward the opening 22*a* of the shielding cover 50 until an angle between the contacting portion 222*b* and the top plate 221 becomes 90 degrees: moreover, the protruding points 224 are disposed on a surface of each of the extending plates 222 opposite to the opening 22*a* of the shielding cover 50.

Figure 9:
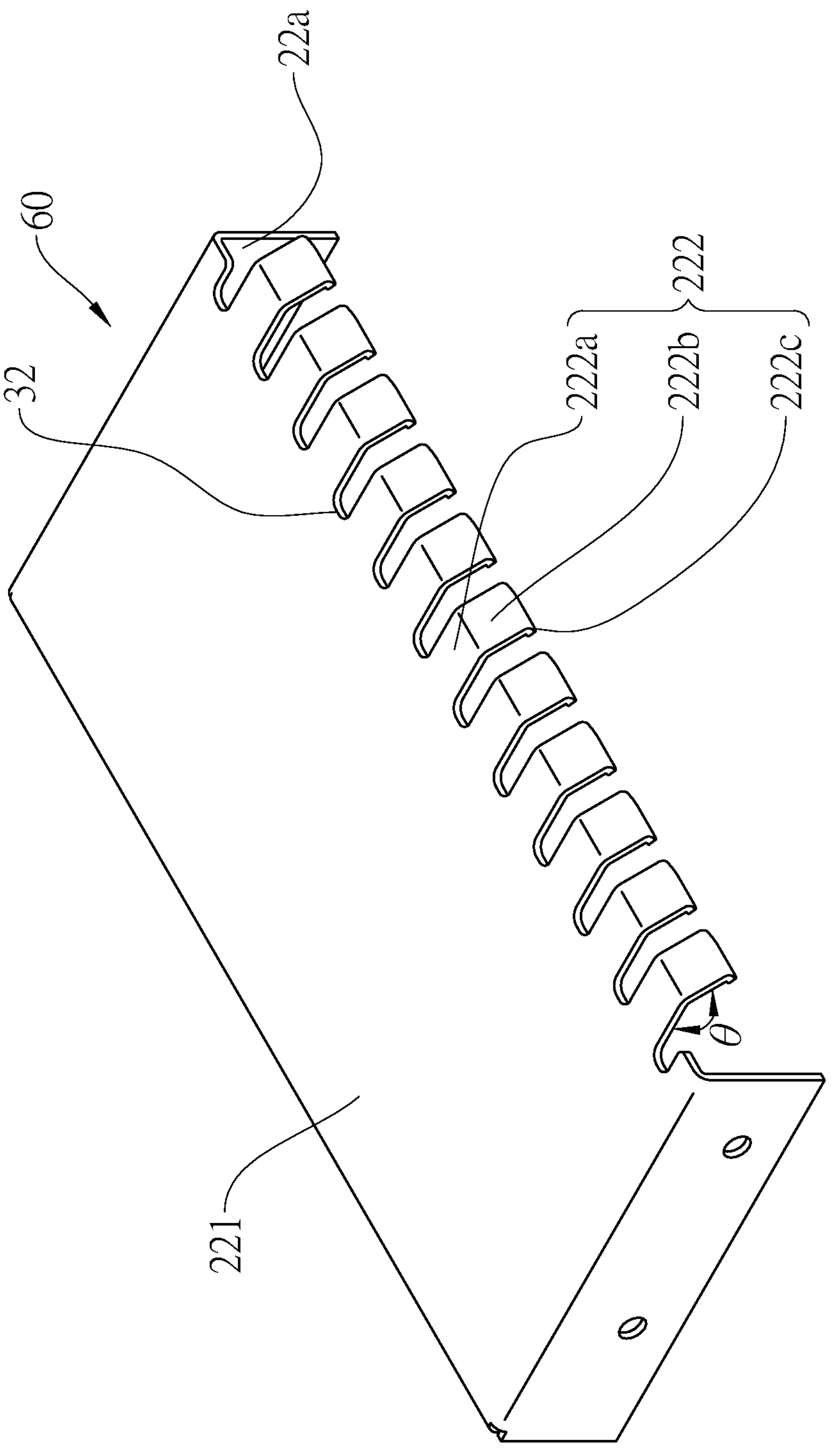
FIG. 9 is a perspective view of the shielding member according to still another embodiment of the present disclosure.

A shielding cover 60 according to still another embodiment of the present disclosure is illustrated in FIG. 9 and has almost the same structure as the shielding cover 22 of the embodiment, except that the angle between the contacting portion 222*b* and the top plate 221 in the embodiment is 90 degrees as an example: in the current embodiment, an angle θ between the contacting portion 222*b* and the top plate 221 could be greater than 90 degrees and be less than 180 degrees as shown in FIG. 9, thereby ensuring that the contacting portion 222*b* is actually in contact with the metal housing C1 of the electronic card C; additionally, in the current embodiment, the shielding cover 60 is provided without the protruding points 224 of the embodiment: the top plate 221 of the shielding cover 60 has a plurality of recesses 32 formed by recessing inward from the opening 22*a* of the shielding cover 60; the number of the extending plates 222 of the shielding cover 60 is plural, wherein the extending plates 222 and the recesses 32 are arranged in a staggered arrangement in the horizontal direction X: the connecting portion 222*a* of each of the extending plates 222 is connected to a peripheral edge of a side of the top plate 221 on the opening 22*a*: the contacting portion 222*b* of each of the extending plates 222 bends toward the opening 22*a* of the shielding cover 60 until the angle θ between the contacting portion 222*b* and the top plate 221 in the current embodiment becomes 135 degrees, and a free end of the contacting portion 222*b* has a bending portion 222*c*, so that when the electronic card C is inserted into the card slot 12, the bending portions 222*c* of the shielding cover 60 could be actually in contact with the metal housing C1 of the electronic card C.

With the aforementioned design, the contacting portion 222*b* bends toward the opening 22*a* of the shielding covers 22, 30, 40, 50, 60, so that when the contacting portion 222 is in contact with the metal housing C1 of the electronic card C, the contacting portion 222*b* could be in contact with a side wall of the metal housing C1 of the electronic card C without covering the cooling zone C1*a* of the top portion of the metal housing C1 of the electronic card C. In this way, an area of the cooling zone C1*a* of the metal housing C1 of the electronic card C could be increased, thereby solving the problem that a conventional shielding member causes the poor cooling efficiency of the electronic card C.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A shielding member adapted to cover a card edge connector, wherein the card edge connector has a card slot for inserting an electronic card: the shielding member comprises:

a shielding cover covering the card edge connector and having an opening disposed in a position corresponding to a jack of the card slot: the shielding cover comprises a top plate, at least one extending plate, and a plurality of side plates, wherein the top plate is disposed on a top portion of the card edge connector: the plurality of side plates are connected to the top plate and are disposed on a plurality of side portions of the card edge connector: the at least one extending plate is located near the opening of the shielding cover and has a connecting portion and a contacting portion connected to the connecting portion, wherein the connecting portion is connected to the top plate: the contacting portion is formed by bending toward the opening of the shielding cover and is in contact with the electronic card in a direction away from the opening.

2. The shielding member as claimed in claim 1, wherein at least one through hole is disposed between the top plate and the contacting portion of the at least one extending plate.

3. The shielding member as claimed in claim 1, wherein the top plate has a plurality of recesses formed by recessing inwards from the opening of the shielding cover; the at least one extending plate comprises a plurality of extending plates: the plurality of recesses and the plurality of extending plates are arranged in a staggered arrangement in a direction.

4. The shielding member as claimed in claim 1, wherein a surface of the contacting portion opposite to the opening of the shielding cover has a plurality of protruding points: the protruding points are arranged in a direction.

5. The shielding member as claimed in claim 1, further comprising a shielding frame, wherein the shielding frame comprises a top frame and a plurality of side frames: the top frame is disposed on the top portion of the card edge connector: the plurality of side frames are connected to the top frame and are disposed on the plurality of side portions of the card edge connector: the shielding frame is disposed on the card edge connector; the shielding cover covers the shielding frame and is in contact with the shielding frame.

6. The shielding member as claimed in claim 5, wherein either the plurality of side frames or the plurality of side plates have at least one protruding member, and the other one of the plurality of side frames and the plurality of side plates has at least one engaging hole matching with the at least one protruding member: the at least one protruding member is engaged with the at least one engaging hole.

7. The shielding member as claimed in claim 1, wherein the contacting portion has a bending portion being in contact with the electronic card.

8. A card edge connector with a shielding structure disposed on a circuit board, comprising:

a card edge connector, wherein a side of the card edge connector has a card slot for inserting an electronic card: the card edge connector comprises a plurality of conductive terminals disposed on a jack of the card slot; and the shielding member as claimed in claim 1, wherein the shielding member covers the card edge connector.

9. A card edge connector with a shielding structure disposed on a circuit board, comprising:

a card edge connector, wherein a side of the card edge connector has a card slot for inserting an electronic card: the card edge connector comprises a plurality of conductive terminals disposed on a jack of the card slot; and the shielding member as claimed in claim 2, wherein the shielding member covers the card edge connector.

10. A card edge connector with a shielding structure disposed on a circuit board, comprising:

a card edge connector, wherein a side of the card edge connector has a card slot for inserting an electronic card: the card edge connector comprises a plurality of conductive terminals disposed on a jack of the card slot; and the shielding member as claimed in claim 3, wherein the shielding member covers the card edge connector.

11. A card edge connector with a shielding structure disposed on a circuit board, comprising:

a card edge connector, wherein a side of the card edge connector has a card slot for inserting an electronic card: the card edge connector comprises a plurality of conductive terminals disposed on a jack of the card slot; and the shielding member as claimed in claim 4, wherein the shielding member covers the card edge connector.

12. A card edge connector with a shielding structure disposed on a circuit board, comprising:

a card edge connector, wherein a side of the card edge connector has a card slot for inserting an electronic card: the card edge connector comprises a plurality of conductive terminals disposed on a jack of the card slot; and the shielding member as claimed in claim 5, wherein the shielding member covers the card edge connector.

13. A card edge connector with a shielding structure disposed on a circuit board, comprising:

a card edge connector, wherein a side of the card edge connector has a card slot for inserting an electronic card: the card edge connector comprises a plurality of conductive terminals disposed on a jack of the card slot; and the shielding member as claimed in claim 6, wherein the shielding member covers the card edge connector.

14. A card edge connector with a shielding structure disposed on a circuit board, comprising:

a card edge connector, wherein a side of the card edge connector has a card slot for inserting an electronic card: the card edge connector comprises a plurality of conductive terminals disposed on a jack of the card slot; and the shielding member as claimed in claim 7, wherein the shielding member covers the card edge connector.

15. The card edge connector with the shielding structure as claimed in claim 9, wherein a projection of the at least one through hole on the card edge connector at least partially covers the plurality of conductive terminals.

16. The card edge connector with the shielding structure as claimed in claim 11, wherein at least one through hole is disposed between the top plate and the contacting portion of the at least one extending plate: a projection of the at least one through hole on the card edge connector at least partially covers the plurality of conductive terminals.

17. The card edge connector with the shielding structure as claimed in claim 12, wherein at least one through hole is disposed between the top plate and the contacting portion of the at least one extending plate: a projection of the at least one through hole on the card edge connector at least partially covers the plurality of conductive terminals.

18. The card edge connector with the shielding structure as claimed in claim 10, wherein a projection of the plurality of recesses on the card edge connector at least partially covers the plurality of conductive terminals.

19. The card edge connector with the shielding structure as claimed in claim 11, wherein the top plate of the shielding cover has a plurality of recesses formed by recessing inward from the opening of the shielding cover: a projection of the plurality of recesses on the card edge connector at least partially covers the plurality of conductive terminals.

20. The card edge connector with the shielding structure as claimed in claim 12, wherein the top plate of the shielding cover has a plurality of recesses formed by recessing inward from the opening of the shielding cover: a projection of the plurality of recesses on the card edge connector at least partially covers the plurality of conductive terminals.

* * * * *